(12) United States Patent
Fujita

(10) Patent No.: US 6,299,201 B1
(45) Date of Patent: *Oct. 9, 2001

(54) STEERING WHEEL

(75) Inventor: Yoshiyuki Fujita, Nagoya (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/659,338

(22) Filed: Sep. 12, 2000

Related U.S. Application Data

(63) Continuation of application No. 08/906,827, filed on Aug. 6, 1997, now Pat. No. 6,139,051.

(30) Foreign Application Priority Data

Aug. 6, 1996 (JP) .................................................. 8-207344

(51) Int. Cl.$^7$ .............................. B60R 21/16; H01H 9/00
(52) U.S. Cl. ........................... 280/731; 74/552; 200/61.55
(58) Field of Search ..................................... 280/731, 750; 200/61.54, 61.55; 74/552

(56) References Cited

U.S. PATENT DOCUMENTS

| | | |
|---|---|---|
| 3,887,215 | 6/1975 | Albrecht et al. . |
| 5,228,362 | 7/1993 | Chen et al. . |
| 5,327,796 * | 7/1994 | Ernst et al. ............................ 74/552 |
| 5,410,114 * | 4/1995 | Furuie et al. ..................... 200/61.55 |
| 5,508,482 | 4/1996 | Martin et al. . |
| 5,584,501 * | 12/1996 | Walters .............................. 280/728.2 |
| 5,593,178 | 1/1997 | Shiga et al. . |
| 5,597,177 | 1/1997 | Matsuura . |
| 5,624,130 * | 4/1997 | Ricks ................................. 280/728.2 |
| 6,062,592 * | 5/2000 | Sakurai et al. .................... 280/728.2 |
| 6,139,051 * | 10/2000 | Fujita .................................... 280/731 |

FOREIGN PATENT DOCUMENTS

| | | |
|---|---|---|
| 2270657 | 3/1994 | (GB) . |
| 07017407 | 1/1995 | (JP) . |

* cited by examiner

*Primary Examiner*—Eric Culbreth
*Assistant Examiner*—David R. Dunn
(74) *Attorney, Agent, or Firm*—Pillsbury Winthrop LLP

(57) ABSTRACT

There is disclosed an automotive steering wheel W1 including a heavy air bag system 30. This air bag system 30 is held by a horn-switching mechanism 40. Although the air bag system 30 is heavy, the operator has a good feel for the operation of the horn-switching mechanism 40. This horn-switching mechanism 40 comprises a stationary member 41, a movable member 48, a switch main body 50, coil springs 55, and a jawed bolt 56. The switch main body 50 comprises a stationary contact 52 mounted on the stationary member 41 and a movable contact 54 mounted on the movable member 48. The coil springs 55 bias the movable member 48 upward. The jawed bolt 56 permits the movable member 48 to be moved toward the stationary member 41 and limits the distance of the movable member 48 from the stationary member 41. At least one of the coil springs 55 is located at a height substantially equal to the height of the resultant center of gravity G of all components biased upward by all the coil springs 55.

7 Claims, 7 Drawing Sheets

STEERING WHEEL

This is a continuation of application Ser. No. 08/906,827, filed Aug. 6, 1997, now U.S. Pat. No. 6,139,051.

BACKGROUND OF THE INVENTION

1. Field of the Invention

The present invention relates to a steering wheel mounted in a vehicle and, particularly, to a steering wheel equipped with an air bag system. More particularly, the invention relates to a steering wheel including an air bag system supported by horn-switching mechanisms.

2. Description of the Related Art

A known steering wheel of this kind is described, for example, in Japanese Utility Model Unexamined Publication No. 143734/1990 and shown in FIG. 1. This steering wheel, generally indicated by WO, has a wheel main body 1. An air bag system 4 is mounted at the top of the central portion of the wheel main body 1. Each horn-switching mechanism 10 is located between the wheel main body 1 and the air bag system 4. The wheel main body 1 includes part of the steering wheel WO and excludes the air bag system 4 and the horn-switching mechanisms 10.

The air bag system 4 is composed of an air bag 5, an inflator 6, a pad 7, and a bag holder 8. The air bag 5 is folded so that it is capable of inflating. The inflator 6 supplies a gas used to inflate the air bag 5. The pad 7 covers the folded air bag 5. The bag holder 8 holds the air bag 5, the inflator 6, and the pad 7.

The horn-switching mechanisms 10 are located under the bag holder 8 at opposite sides, respectively, of the holder 8 and extend forward and rearward. FIG. 1 is a cross-sectional view of the steering wheel WO, taken in the longitudinal direction and in the front and rear direction.

Each horn-switching mechanism 10 comprises a stationary member 11, a movable member 12, a coil spring 16, and a jawed bolt 19. The stationary member 11 consists of a metal plate and is connected with a metal core 2 forming the steering wheel main body 1. Fixed contacts 14 are mounted to the front and rear ends, respectively, of the stationary member 11. The movable member 12 is made of a metal plate and located above the stationary member 11. Movable contacts 15 are positioned at the front and rear ends, respectively, of the movable member 12. The coil spring 16 is positioned between the movable member 12 and the stationary member 11 and forms a means for biasing the movable member 12 upward. The jawed bolt 19 forms a means for limiting the distance by which the movable member 12 is spaced from the stationary member 11. The jawed bolt 19 is screwed to the metal core 2 from above the movable member 12.

A lead wire (not shown) is connected with each movable member 12 of the horn-switching mechanisms 10 so that the movable member 12 is electrically connected with the positive side of the horn-activating circuit. Each stationary member 11 is electrically connected with the negative side of the horn-activating circuit via the metal core 2.

The fixed contacts 14 and the movable contacts 15 together form a switch main body Insulating spacers 17, 18 and rubber rings 20 electrically insulate the movable members 12 from the stationary members 11 when they are in contact with both the coil springs 16 and the jawed bolts 19.

Each movable member 12 has a mounting member (not shown) attached thereto permitting the bag holder 8 to be secured with bolts.

In the prior art steering wheel WO, the horn-switching mechanisms 10 are located on opposite sides of, and under, the heavy air bag system 4. That is, the air bag system 4 of the prior art steering wheel WO is swingably supported by the coil springs 16 of the horn-switching mechanisms 10 that are at opposite sides of, and under, the air bag system 4.

When the coil springs 16, used to bias the horn-switching mechanisms 10 of the prior art steering wheel WO, have a low spring constant, the horn-switching mechanisms 10 may be inadvertently activated because the heavy air bag system 4 can easily tilt or swing horizontally due to vibrations of the vehicle.

More specifically, in the prior art steering wheel WO, the air bag system 4 and the movable member 12 are held upwardly by all the coil springs 16. In the illustrated example, four coil springs are used. The position of the resultant center of gravity G of these supported members (the air bag system 4 and the movable member 12) is higher than the coil springs 16 by as much as 30 mm. With the forward coil spring 16F placed at the center of a rotation moment, a rotation moment, P×L, acts on the rear coil spring 16B, where P is the force of a rearward swinging movement at the side of the center of gravity G and L is the distance between the center of gravity G and the coil spring 16F in the direction of height. The rotation moment, P×L, compresses the coil spring 16B and brings the rear movable contact 15B into contact with the fixed contact 14B. As a result, the switch main body 13B is electrically activated.

Accordingly, the coil springs 16 biasing the horn-switching mechanisms 10 have high spring constants. However, when coil springs having high spring constants are used, as in the coil springs 16, a larger load must be applied to manually activate the horn-switching mechanisms 10. This deteriorates the feel for the horn-switching mechanisms experienced by the driver when the horn-switching mechanisms 10 are operated.

SUMMARY OF THE INVENTION

It is an object of the present invention to provide a steering wheel having horn-switching mechanisms which hold a heavy air bag system but give the driver a good feel for the manual operation of the horn-switching mechanisms.

This object is achieved by providing a steering wheel comprising a steering wheel main body having front and rear surfaces, a horn-switching assembly, and an air bag assembly. The horn-switching assembly comprises a stationary member mounted on the steering wheel main body, a support plate, a movable member movable away from and towards the support plate between a non-activated position in which said movable member is spaced by a distance from the support plate and an activated position, and a plurality of horn-switching subassemblies mounted on the support plate.

The horn-switching subassemblies respectively comprise biasing means (e.g., springs), limiting members, and switch main bodies. The biasing means are mounted between the stationary member and the movable member to collectively bias the movable member upward towards the non-activated position. The limiting members interconnect the support plate with the movable member to form an installable unit which is mountable to the stationary member and is constructed and arranged to limit the distance by which the movable member moves away from the support plate. The switch main bodies respectively comprise stationary contacts mounted on the stationary member and movable contacts mounted on the movable member. When the movable member is in the non-activated position, the stationary contacts are spaced from the movable contacts. On the other hand, when sufficient pressure is applied on the front of the steering wheel main body to overcome the biasing force of the biasing means and thereby move the movable member, the stationary contacts are electrically connected with the movable contacts.

The air bag assembly, which includes at least an air bag and inflator, is supported by the movable member of the horn-switching mechanism and is interconnected to the support plate by the limiting members.

At least one of the biasing means is mounted higher than the inflator so that the biasing means are closer than the inflator to the front surface of the steering wheel main body. Preferably, when the movable member is in the non-activated position, at least one, but preferably all, of the biasing means has a vertical center that is substantially level in height with a center of gravity of all components of the steering wheel that are collectively biased upwardly by the biasing means.

In the steering wheel in accordance with the invention, at least one biasing means is located at a height substantially equal to the height of the resultant center of gravity of all the components that are biased upwardly. Therefore, if one biasing means is not disposed around the height of the resultant center of gravity but is located at the center of the rotation moment, the rotation moment, P×L, acts on the biasing means located near the height of the resultant center of gravity, where P is the force of a horizontal swinging movement acting on the center of gravity G of the air bag system and L is the distance between the center of gravity G and the biasing means located near the height of the center of gravity.

This rotation moment, P×L, barely compresses the biasing means located near the height of the center of gravity because L is close to zero. Therefore, inadvertent activation of the switch main bodies to operate the horn can be prevented. In addition, the load needed to manually operate the horn-switching mechanisms is reduced because biasing means with lower spring constants may be used or the number of the biasing means may be reduced.

Accordingly, in the steering wheel in accordance with the invention, if a heavy air bag system is mounted to the horn-switching mechanisms, the load applied to manually operate the horn-switching mechanisms may be reduced. This can improve the feel experienced by the operator when the horn-switching mechanisms are operated.

The center of the biasing means is located near the height of the center of gravity of the air bag system. The above-described distance L can become close to zero by placing this center of the biasing means at the height of the center of gravity. Consequently, the load required to operate the horn-switching mechanisms may be reduced further by using biasing means having lower spring constants.

When all the biasing means are located near the height of the center of gravity of the air bag system, all the rotational moments produced about the biasing means can be reduced to nearly zero. As a consequence, the load required to manually operate the horn-switching mechanisms may be decreased further by using biasing means of lower spring constants. This may contribute to further improvement to the feel experienced by the operation when operating the horn-switching mechanisms.

Other objects and features of the invention will appear in the course of the description thereof which follows.

DESCRIPTION OF THE PREFERRED EMBODIMENTS

While the preferred embodiments of the invention are hereafter described with reference to the accompanying drawings, it should be understood that the invention is not limited thereto but rather various changes and modifications are possible within the scope of the invention that is delineated by the accompanying claims.

Figure 1:
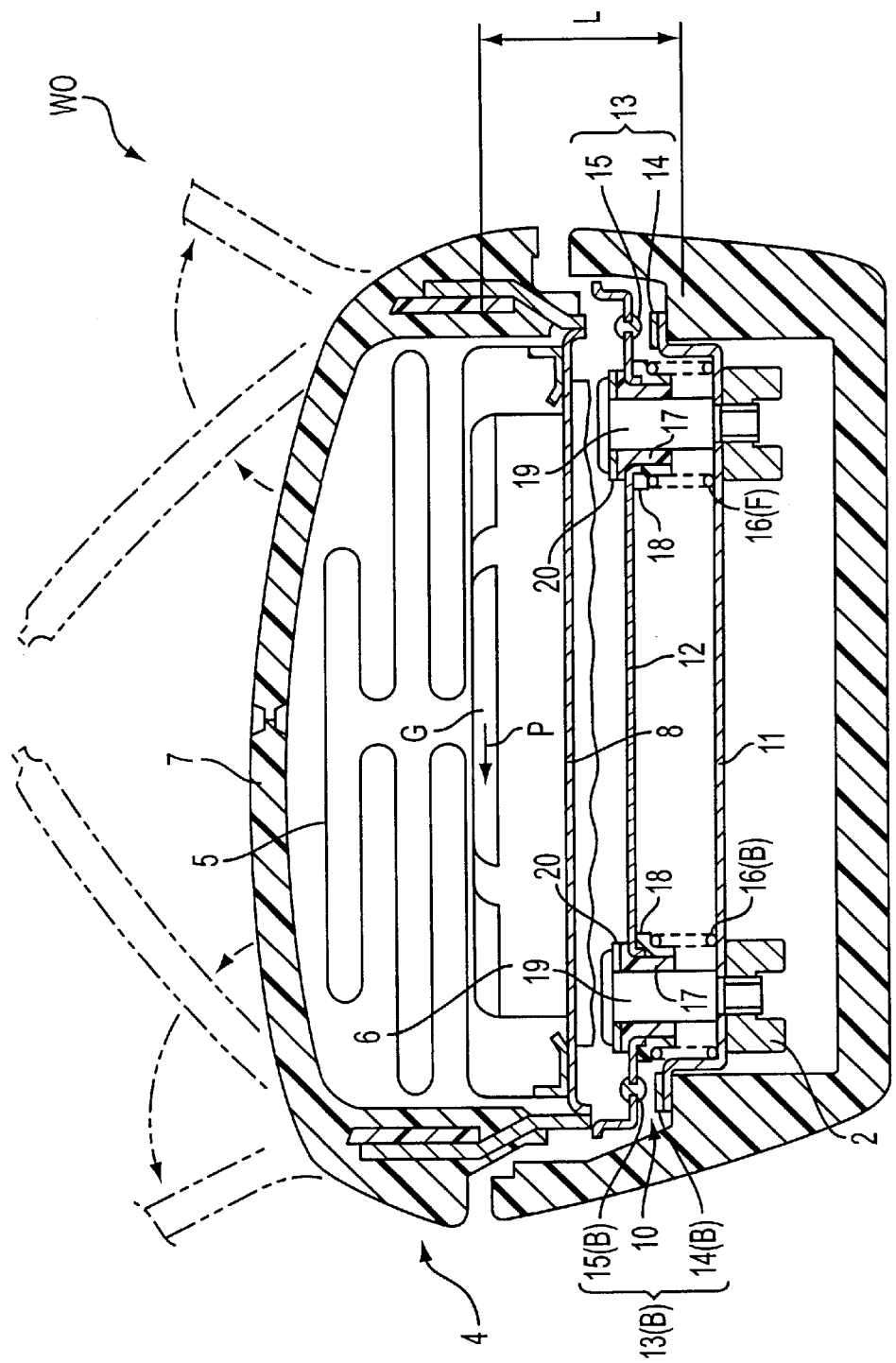
FIG. 1 is a cross-sectional view of the prior art steering wheel.
Figure 2:
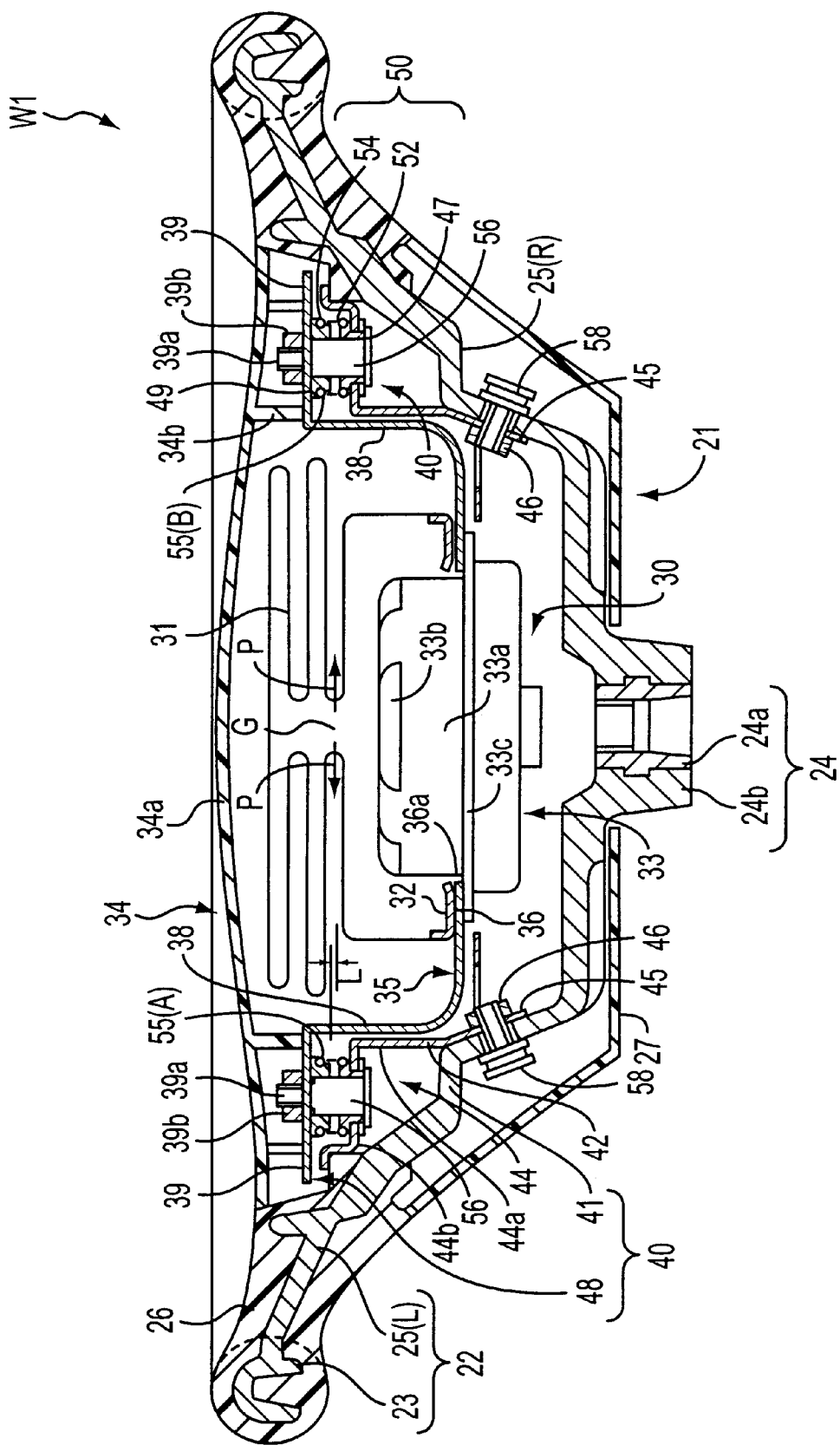
FIG. 2 is a cross-sectional view of a steering wheel in accordance with the invention, taken along line II—II of FIG. 4.
Figure 3:
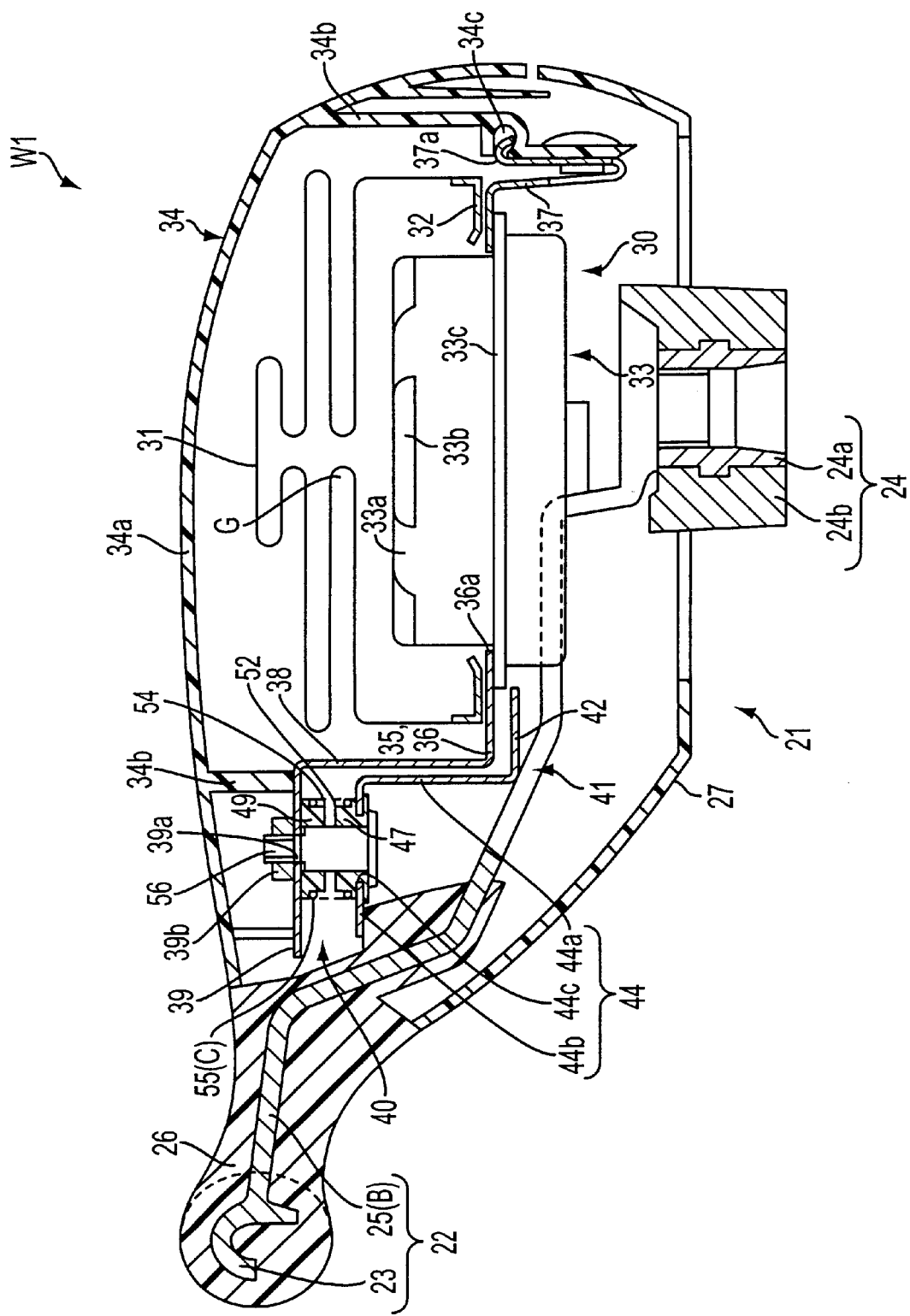
FIG. 3 is a cross-sectional view of the steering wheel shown in FIG. 2, taken along line III—III of FIG. 4.
Figure 4:
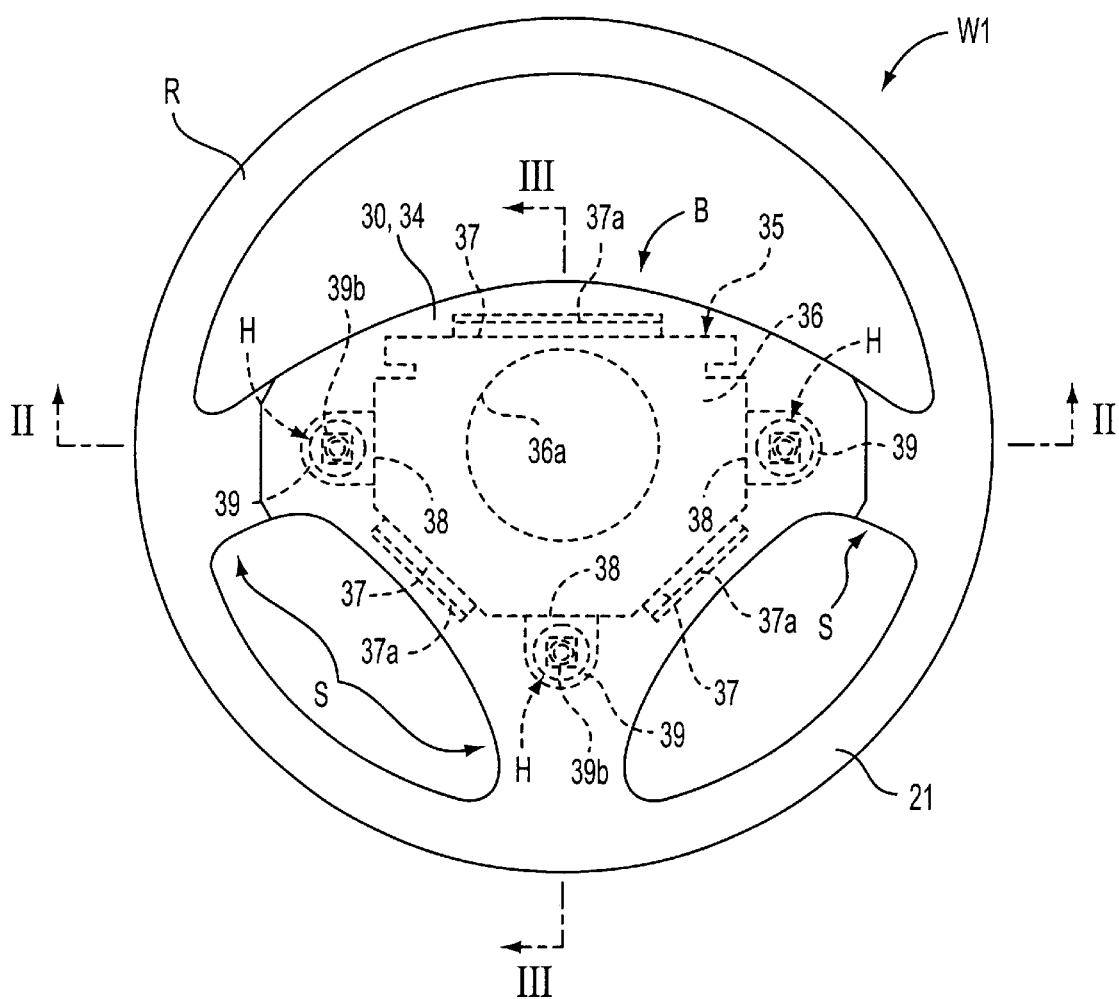
FIG. 4 is a plan view of the steering wheel shown in FIG. 2.

Referring to FIGS. 2–4, there is shown a steering wheel embodying the concept of the present invention. This steering wheel, generally indicated by W1, comprises an annular portion R, a boss portion B located in the center of the annular portion R, and three spokes S connecting the annular portion R with the boss portion B. In terms of components, the steering wheel W1 is composed of a steering wheel main body 21, an air bag system 30, and at least one horn-switching mechanism 40 (FIG. 2). The air bag system 30 is located on top of the boss portion B. The horn-switching mechanism 40 is connected to the body 21 of the steering wheel and holds the air bag system 30.

The steering wheel main body 21 is part of the steering wheel W1 excluding the air bag system 30 and the horn-switching mechanism 40. The main body 21 of the steering wheel has a metal core 22 that connects the annular Portion R, the boss portion B, and the spokes S. The metal core 22 has a core portion 23 located at the annular portion and core portions 25 that are located at the spokes and at the side of the core portion 23. These core portions 23 and 25 are coated with a coating layer 26 made of a synthetic resin. A metal core 24 at the location of the boss portion B is composed of a boss 24a and a coating portion 24b. The boss 24a is made of steel and connected to the steering shaft (not shown). The coating portion 24b is made of an aluminum alloy or the like and surrounds the boss 24a. The coating portion 24b is formed integrally with the core portions 23 and 25. A rear metal core 25B at the spoke locations bifurcates and connects to the coating portion 24b of the metal core 24 of the boss portion. The main body 21 of the steering wheel has a lower cover 27 that covers the bottom of the boss portion B. The lower cover 27 is screwed to the metal core 22.

The air bag system 30 comprises an air bag 31, an inflator 33, a pad 34, and a bag holder 35. The air bag 31 is folded so as to be inflatable. The inflator 33 supplies a gas used for inflation into the air bag 31. The pad 34 covers the folded air bag 31. The bag holder 35 holds the air bag 31, the inflator 33, and the pad 34.

The inflator 33 comprises a substantially cylindrical body 33a and a flange 33c. A gas discharge port 33b is formed at the top of the body 33a. The flange 33c protrudes from the outer surface of the body 33a.

The pad 34 is made of a synthetic resin and comprises a top wall portion 34a and a side wall portion 34b. When the air bag 31 inflates, the top wall portion 34a breaks at a given location. The side wall portion 34b is substantially hexagonally shaped at its perimeter and extends downwardly from around the outer surface of the top wall portion 34a. The side wall portion 34b has an engaging groove 34c formed at a given position in the inner surface. The bag holder 35 has side wall portions 37 provided with engaging claws 37a (described later). These claws 37a engage the fringes of the engaging groove 34c. Ribs (bearing no reference numeral) are formed on the bottom surface of the top wall portion 34a. These ribs bear against mounting portions 39 (described later) of the bag holder 35.

The bag holder 35 holds the air bag 31 and the inflator 33 by using an annular retainer 32, which has a plurality of bolts (not shown) extending downward. These bolts pass through the air bag 31, the bag holder 35, and the flange 33c of the inflator 33. Nuts are screwed to the bolts so that the air bag 31 and the inflator 33 are held by the bag holder 35. The side wall portion 34b is mounted with rivets so that the bag 34 is held by the bag holder 35.

The bag holder 35 is a made of metal plate and comprises a lateral plate portion 36, side wall portions 37, and three interconnecting plate portions 38. The lateral plate portion 36 has a centrally provided insertion hole 36a into which the body 33a of the inflator can be inserted from below. The side wall portions 37 extend from both sides of the front and rear fringes, respectively, of the lateral plate portion 36 and take a V-shaped form in cross section. The three interconnecting plate portions 38 extend upward from right and left side fringes and from the rear fringe, respectively.

Each side wall portion 37 is provided with an engaging claw 37a interlocked in the groove 34c located in the pad side wall portion 34b. Each side wall portion 37 is formed with mounting holes (not shown) used to mount the pad side wall portion 34b with rivets.

The mounting portions 39 extending outwardly and laterally are formed at the top ends of the interconnecting plate portions 38. Nuts 39b are welded to the mounting portions 39, which are provided with mounting holes 39a. At the positions of the mounting portions 39, the air bag system 30 is connected to the horn-switching mechanism 40. These mounting portions 39 form parts of a movable member 48 of the horn-switching mechanism 40. Lead wires (not shown) are connected with the bag holder 35 to electrically connect the holder with the positive side of the horn-activating circuit.

Figure 6:
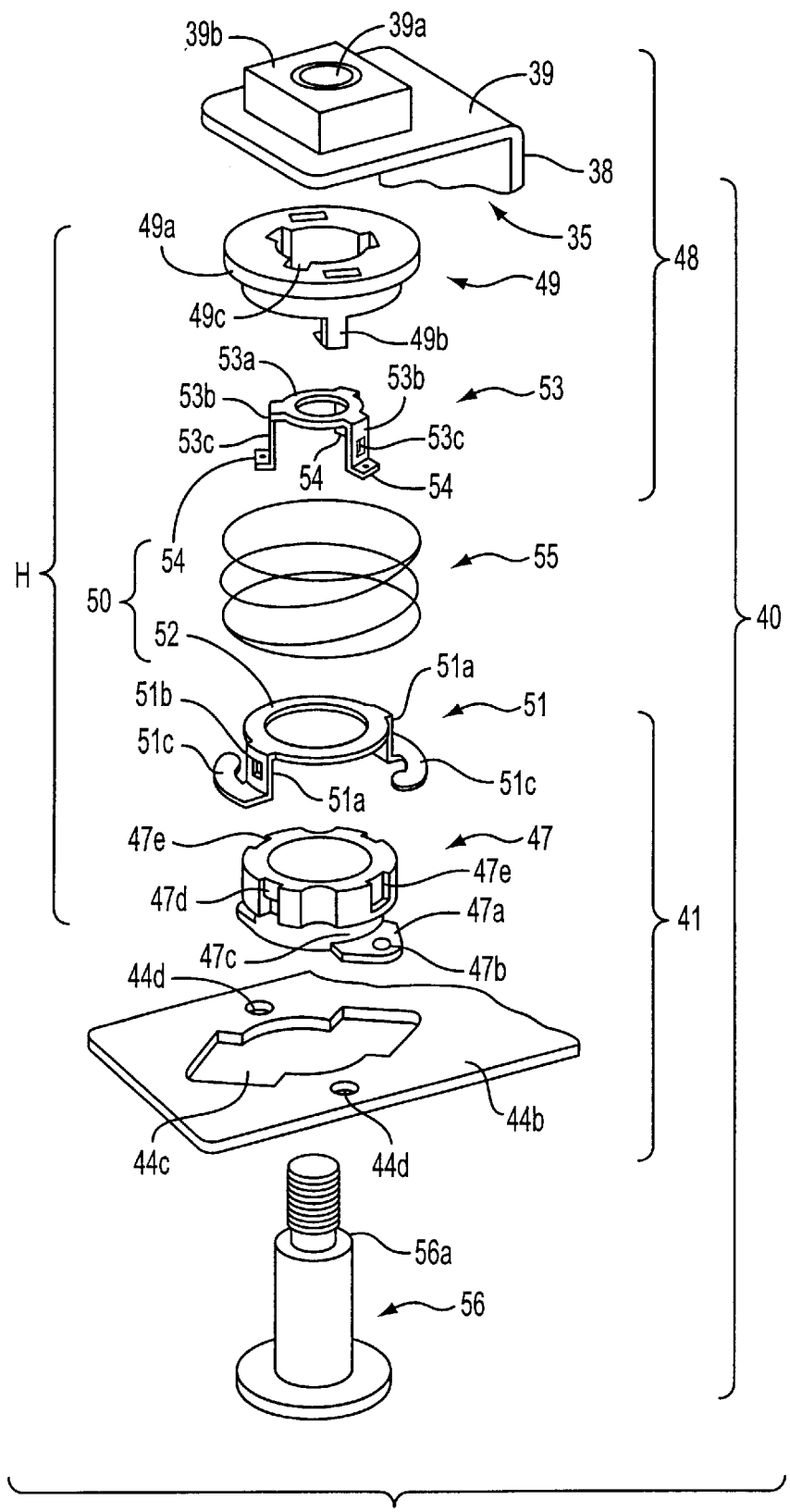
FIG. 6 is an exploded perspective view of a switch subassembly used in the steering wheel shown in FIG. 4.

The horn-switching mechanism 40, which is shown in exploded form in FIG. 6, comprises a stationary member 41, the movable member 48, a switch main body 50, a coil spring 55, and a jawed bolt 56. The stationary member 41 is connected to the metal core 25 in the spoke portions. The movable member 48 is located above the stationary member 41. The switch main body 50 comprises a stationary contact member 51 and a movable contact member 53 which include a stationary contact 52 and a movable contact 54, respectively. The coil spring 55, which acts as a biasing means, is disposed between the stationary member 41 and the movable member 48 and biases the movable member 48 upwardly. The jawed bolt 56 allows the movable member 48 to move toward the stationary member 41 and acts as a means for limiting the distance of the movable member 48 from the stationary member 41.

In the illustrated embodiment, the stationary member 41 comprises a support plate 42 and a support grommet 47.

Figure 5:
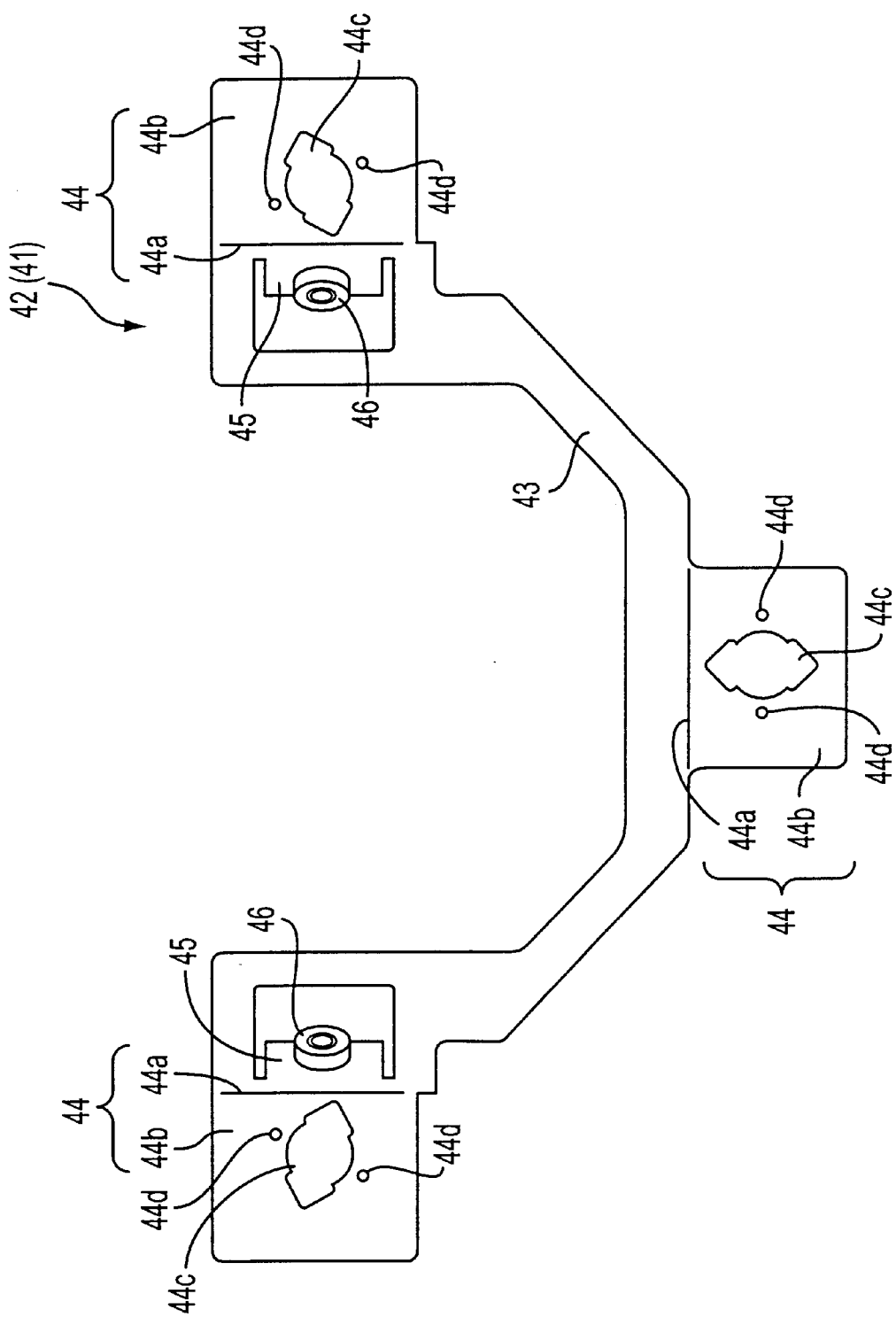
FIG. 5 is a plan view of a support plate holding a stationary member used in the steering wheel shown in FIG. 4.

The support plate 42 is mounted to a left spoke portion metal core 25L and a right spoke portion metal core 25R with bolts 58. The support plate 42 is made of a metal plate and comprises a connecting rod portion 43, shown in FIG. 5, and support base portions 44, as shown in FIGS. 2, 3, and 5. The connecting rod portion 43 has a U-shaped form in a plane view (see FIG. 5). The support base portions 44 extend upwardly from the left fringe, the right fringe, and the rear fringe, respectively, of the connecting rod portion 43 and extend outwardly from their top ends.

Each support base portion 44 comprises vertical plate portions 44a and base body portions 44b. The vertical plate portions 44a extend upwardly from the connecting rod portion 43. The base body portions 44b extend outwardly from the top ends of the vertical plate portion 44a. Each base body portion 44b has centrally provided mounting hole 44c. This hole 44c consists principally of a circular hole with the inclines of right-angled triangles attached to its opposite fringes that are in symmetrical positions. Each base body portion 44b has small circular engaging holes 44d on opposite sides of the mounting hole 44c.

Connecting portions 45 descend obliquely from around the right and left vertical plate portions 44a of the connecting rod portions 43. Nuts 46 are firmly secured to the connecting portions 45 to mount the support slate 42 to the left spoke portion metal core 25L and the right spoke portion metal core 25R with the bolts 58.

Figure 7:
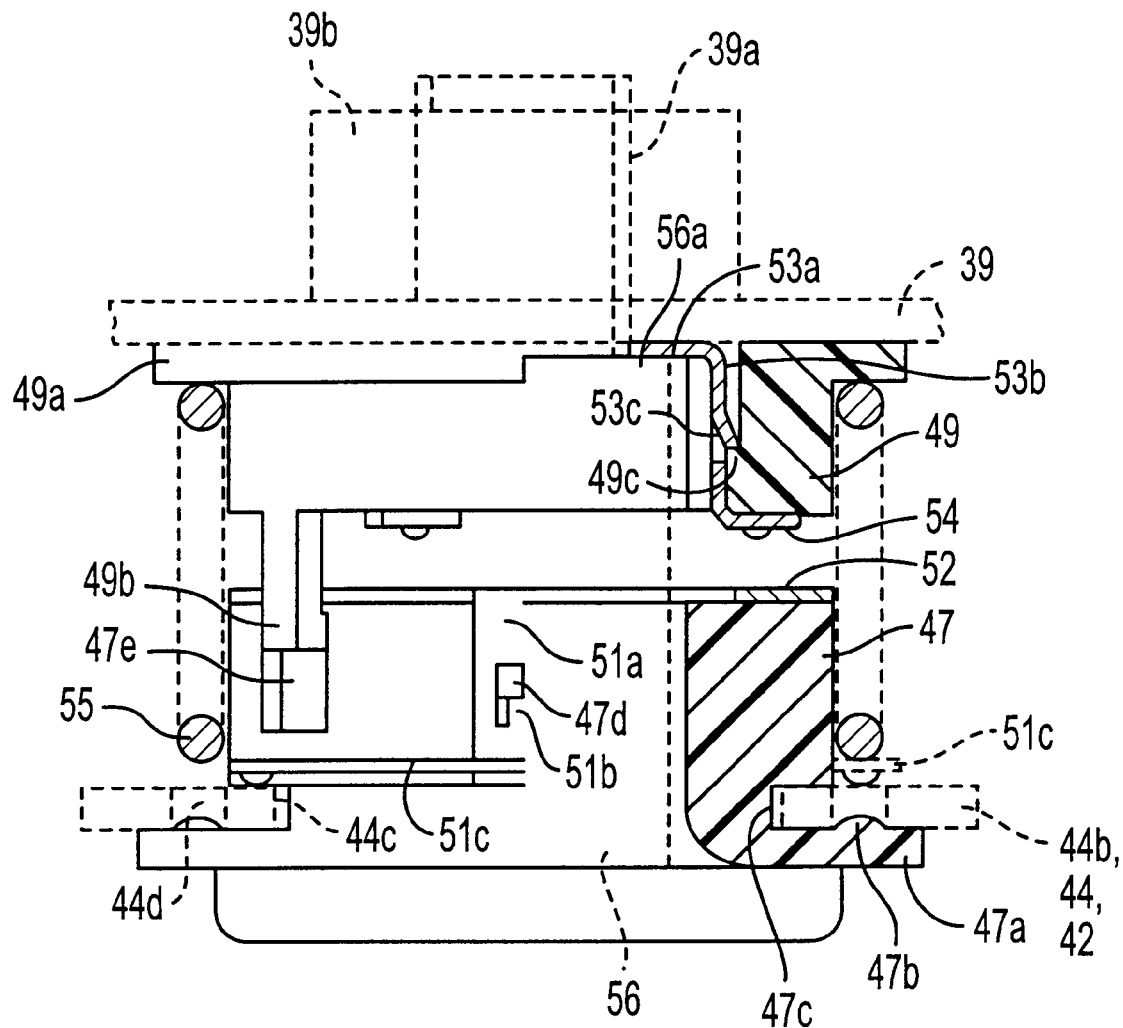
FIG. 7 is a partial cutaway of the front elevation of the switch subassembly shown in FIG. 6.

As shown in FIGS. 6 and 7, the support grommet 47 is substantially cylindrical in shape and made of an insulating synthetic resin such as polyacetal. An engaging plate portion 47a conforming to the shape of the opening in the mounting hole 44c in each support base portion 44 is mounted to the bottom of the support grommet 47. This grommet 47 has a recess 47c corresponding to the arc-shaped portion of the mounting hole 44c, the recess 47c being located over the engaging plate portion 47a. A protrusion 47b is formed on the top surface of the engaging plate portion 47a and is inserted in the engaging hole 44d. A pair of engaging step portions 44d and a pair of recesses 47e are formed at symmetrical positions in the outer surface of the support grommet 47. The stationary contact members 51 (described further below) are engaged at the positions of the engaging step portions 47d. Insulating spacers 49 have engaging claws 49b and are placed in the recesses 47e, respectively, so as to be movable downwardly.

The stationary contact member 51 is made of spring steel and includes a stationary contact 52, engaging portions 51a, and spring portions 51c. The stationary contact 52 is preferably annular in shape. The engaging portions 51a extend downwardly from symmetrical positions on the outer fringe of the stationary contact 52. Each spring portion 51c extends downward from the bottom end of the corresponding engaging portion 51a and is curved. The engaging portions 51 a have inwardly protruding engaging claws 51b that engage the engaging step portions 47d, respectively, of the support grommet 47. When the support grommet 47 is mounted to the support base portion 44 with a bayonet-type fitting, the spring portions 51c of the stationary contact member 51 push against the fringes of the mounting holes 44c on the top surfaces of the base body portions 44b of the support base portion 44.

The spring portions 51c of the stationary contact member 51 press the top surfaces of the engaging plate portions 47a against the fringes of the mounting holes 44c on the lower surfaces of the base body grommet 47 is mounted with portions 44b. When the support grommet 47 is mounted with the bayonet fitting, the engaging plate portions 47a are inserted into the mounting holes 44c in the support base portions 44 from above. Then, the grommet 47 is rotated through 90°. The protrusion 47b on the engaging plate portion 47a is inserted into the engaging hole 44d in the support base portion 44.

When the engaging claws 51b of the stationary contact member 51 are engaged with the engaging step portions 44d of the support grommet 47, the stationary contact 52 rests on the top end surface of the grommet 47. When the support plate 42 is mounted to the left spoke portion metal core 25L and the right spoke portion metal core 25R with the bolts 58, the stationary contact 52 of the stationary contact member 51 is electrically connected with the negative side of the horn-activating circuit throughout the spring portion 51c of the stationary contact member 51, the support plate 42, and the metal cores 25R, 25L.

In the illustrated embodiment, the movable member 48 comprises the mounting portions 39 of the bag holder 35 and insulating spacers 49.

These insulating spacers 49 are substantially cylindrical in shape and made of a synthetic resin, having insulation qualities, such as polyacetal. As shown in FIGS. 6 and 7, each insulating spacer 49 comprises a spring seat 49a, two engaging claws 49b, and three engaging step portions 49c. The spring seat 49a protrudes like a jaw from the top outer surface. The engaging claws 49b protrude downward from the bottom of the spring seat 49a. The engaging step portions 49c are formed on the inner surfaces of the spring seat 49a. The engaging claws 49b are placed in the recesses 47e formed in the support grommet 47, allowed to move downwardly toward the annular stationary contact 52 of the stationary contact member 51, and engage with the contact 52. The engaging step portions 49c inhibit movement of a movable contact member 53.

The movable contact member 53 is made of spring steel and comprises an annular base portion 53a, three engaging portions 53b, and movable contacts 54. The engaging portions 53b extend downward from the outer surface of the base portion 53a. The movable contacts 54 extend outwardly from the bottom ends of the engaging portions 53b. Engaging claws 53c, for engaging the engaging step portions 49c of the insulating spacer 49, protrude outwardly from the engaging portions 53b.

When the engaging claws 53c of the movable contact member 53 are anchored to the engaging step portions 49c of the insulating spacers 49, the movable contacts 54 are placed on the bottom surfaces of the insulating spacers 49.

In the illustrated embodiment, the support grommet 47, the insulating spacer 49, and the coil springs 55, together with the stationary contact 52 and the movable contact 54 forming the switch main body 50, are pre-assembled into a switch subassembly H shown in FIG. 4. This subassembly H is fabricated in a manner described below. First, the stationary contact member 51 is mounted to the support grommet 47, and the movable contact member 53 is mounted to the insulating spacer 49. Then, the lower ends of the coil springs 55 are made to bear against the engaging plate portions 47a of the grommet 47. The top ends of the coil springs 55 are abutted against the spring seats 49a of the insulating spacers 49. The engaging claws 49b of the spacers 49 are then inserted into the recesses 47e in the grommet 47 and are engaged to the stationary contact 52 of the stationary contact member 51. Thus, the switch subassembly H is completed. Since the subassembly H is easy to handle, the horn-switching switching mechanisms 40 can be easily assembled.

In this embodiment, the switch subassembly H forms the horn-switching mechanisms 40 which in turn support the air bag system 30. First, the engaging plate portions 47a of the support grommet 47 of each switch subassembly H are inserted into the mounting holes 44c in the base body portions 44b of the support base portion 44 of the support plate 42 and mounted with a bayonet fitting. The mounting portions 39 of the back holder 35 of the air bag system 30 assembled previously are placed above each switch subassembly H. The jawed bolts 56 are inserted into the switch subassemblies H from below and screwed to the nuts 39b of the mounting portions 39, thus forming the horn-switching mechanism 40. This horn-switching mechanism 40 supports the air bag system 30. The horn-switching mechanism 40 and the air bag system 30 are assembled into a subassembly which can be easily mounted to the main body 21 of the steering wheel.

The air bag system 30 is assembled in the manner described below. The retainer 32 is placed in the air bag 31. The air bag 31 is then folded. Bolts (not shown), extending from the retainer, are passed through the bag holder 35 and through the flange 33c of the inflator and secured there with nuts. The engaging claws 37a of the side wall portions 37 of the bag holder are engaged in the engaging grooves 34c in the pad side wall portions 34b. The pad side wall portions 34b are riveted to the side wall portions 37 of the bag holder, thus completing the air bag system 30.

After supporting the air bag system 30 on the horn-switching mechanisms 40, connecting portions 45 of the support plate 42 of the horn-switching mechanisms 40 are made to bear against the left spoke portion metal core 25L and the right spoke portion metal core 25R. From the rear side of the metal cores 25L and 25R, the bolts 58 are screwed to the nuts 46 of the connecting portions 45. Thus, the horn-switching mechanisms 40 can be connected to the body 21 of the steering wheel. Consequently, the steering wheel W1 may be assembled.

The boss 24a on the boss portion metal cores 24 of the steering wheel main body 21 has been previously connected to the steering shaft of the vehicle.

When the jawed bolt 56 is screwed to the nut 39b, the movable contact 53 of each switch subassembly H is pushed by an enlarged portion 56a of the bolt 56, so that the base portion 53a of the movable contact member 53 is pressed against the fringe of the mounting hole 39a of the mounting portion 39 of the bag holder 35. As a result, the movable contact 53 of each switch subassembly H is electrically connected with the positive side of the horn-activating circuit through the lead wires (not shown). When the support plate 42 is secured to the metal cores 25L and 25R of the spokes with the bolts 58, the stationary contact 52 of each switch subassembly H is electrically connected with the negative side of the horn-activating circuit through the spring portion 5c of the stationary contact member 51, the support plate 42 and the metal cores 25L and 25R.

In the present embodiment, when each horn-switching mechanism 40 is connected with the main body 21 of the steering wheel in this manner, the outwardly extending front end portions of the base body portions 44b of the support base portion 44 of the support plate 42 forming the stationary member 41 bear against the coating layer 26 on the metal cores 25 of the spokes of the wheel main body. Thus, the base body portions are supported.

In the illustrated embodiment, the base body portions 44b of the support base portion 44 of the support plate 42 and the mounting portions 39 of the bag holder 35 are placed close to the coating layer 26 of each spoke S. Consequently, the coil springs 55 of each switch subassembly H are so positioned that the vertical center of each coil spring 55 is coincident with the height of the resultant center of gravity G of the components biased upwardly by all the coil springs 55. The components biased upwardly by all the coil springs 55 are the air bag system 30 (air bag 31, retainer 32, inflator 33, pad 34, bag holder 35, lead wires, etc.), the movable member 48 (mounting portions 39, insulating spacer 49, and movable contact member 53), and the jawed bolts 56.

Therefore, in the steering wheel WI of the present embodiment, if one coil spring 55B is placed at the center of a rotation moment as shown in FIG. 2, a rotation moment, P×L, acts on the coil spring 55A, where P is the force of a horizontal swinging movement acting at the center of gravity G (such as of the air bag system 30) and L is the distance between the height of the center of gravity G and the height of the coil spring 55A located at the center of gravity G. Since the distance L is nearly zero, the rotation moment, P×L, barely compresses the coil spring 55A. For this reason, even if the coil spring 55A does not have a high spring constant, the switch body 50 is prevented from being inadvertently activated. In addition, coil springs with lower spring constants can be used at the other coil springs 55B and 56C, because the rotation moment due to swinging movement of the air bag system 30 is small.

Accordingly, in the case of the steering wheel W1 of the present embodiment, if the heavy air bag system 30 is held by the horn-switching mechanisms 40, a coil spring of a low spring constant can be used as the coil spring 55. This can improve the driver's feel for the horn-switching mechanisms 40 when operated. In this embodiment, if the air bag system 30 is as heavy as the prior art air bag system, the load that needs to be applied to manually operate the horn may be reduced to two thirds of the load required in the prior art bag systems.

Usually, the horn is operated by depressing the top wall portion 34a of the pad 34 of the air bag system 30. At this time, the coil spring 55 of each switch subassembly H is compressed, bringing the movable contact 54 of the movable contact member 53 forming the switch body 50 into contact with the stationary contact 52 of the stationary contact material 51, thus activating the horn.

In the embodiment described above, the vertical center of all the coil springs 55 of the horn-switching mechanism 40 is made coincident with the height of the center of gravity G of the components biased upwardly by all the coil springs 55. The height of each switch subassembly H may be shifted so that the center of gravity G lies within the limits defined by the upper and lower ends of each coil springs 55. This structure yields less advantages than the above-described embodiment but the load that must be applied to operate the horn-switching mechanism 40 can be made smaller than in conventional systems.

Furthermore, the center of gravity G may be placed between the upper and lower ends of at least one coil spring 55; the center of gravity G is not placed between the upper and lower ends of any other coil spring 55. In this way, the produced advantages are less conspicuous than in the above-described embodiment, but the load that must be applied to operate the horn-switching mechanism 40 can be smaller than before.

If at least one coil spring 55 is placed at a height substantially equal to the height of the center of gravity G (in other words, at least one coil spring 55 is placed within the steering wheel, and the distance of the height of the center of gravity G separated from the upper or lower end of the coil spring 55 is within approximately half of the vertical length of the spring 55), the aforementioned rotation moment, P×L, can be reduced. Consequently, the load that must be applied to operate the horn-switching mechanism can be made smaller than heretofore. Of course, if the above-described range is exceeded, unwanted operation of the horn due to swinging movement of the air bag system cannot be prevented unless springs of higher spring constants are used. Hence, less advantages will be produced.

In the above-described embodiments, the coil springs 55 are used as examples of the biasing means. Leaf springs may be employed instead.

What is claimed is:

1. The steering wheel comprising:
   a steering wheel main body;
   a horn-switching assembly; and
   an air bag assembly;
   wherein said steering wheel main body includes:
      a ring portion;
      a boss portion arranged at the center of said ring portion;
      a plurality of spoke portions for joining said boss portion and said ring portion;
      a core for joining said ring portion, said boss portion and said spoke portions;
   wherein said air bag assembly is supported to said horn switch assembly and is arranged over the boss portion of said steering wheel main body and includes:
      an air bag formed into a bag shape and folded in an inflatable manner;
      an inflator for feeding said air bag with an inflating gas;
      a pad covering said folded air bag; and
      a bag holder for holding said air bag, said inflator and said pad;
   wherein said horn switch assembly includes:
      a plurality of switch subassemblies having a stationary contact, a movable contact and a spring, and assembled in advance; and
      a support plate having a plurality of base body portions joining said each switch subassembly and a connecting portion connected to said steering wheel main body under said base body portion; and
      said spring is compressed by depressing said pad and said movable contact is contacted with said stationary contact;
   wherein said bag holder includes:
      a lateral plate portion having a hole into which said inflator is inserted;
      an interconnecting plate portion extending upward from the edge of said lateral plate portion; and
      a plurality of mounting portions extending in the outer lateral direction from the upper end of said interconnecting plate portion and arranged over said each switch subassembly;
   wherein said each switch subassembly is joined to said each base body portion of said support plate, and said each mounting portion of said bag holder in said air bag assembly is arranged over said each switch subassembly and thereby said air bag assembly is supported to said horn switch assembly, wherein said air bag assembly is assembled in advance; and
   further, the connecting portion of said support plate is connected to said steering wheel main body and thereby said air bag assembly is arranged over the boss potion of said steering wheel main body.

2. A steering wheel according to claim 1,
wherein the connecting portion of said support plate is arranged at the center side of said ring portion from the spring of said horn switch assembly.

3. A steering wheel according to claim 2,
wherein said connecting portion is connected to a core of said spoke portion.

4. The steering wheel according to claim 1,
wherein each of said base body portions abuts and is supported by the spoke portion of said steering wheel main body.

5. If The steering wheel according to claim 1,
wherein said pad comprises a top wall portion having a segment to be broken at the inflating state of said air bag, and a side wall portion extending downwardly from the outer periphery of said top wall portion; and
wherein each of said mounting portions is arranged so as to project outwardly from said side wall portion at the lower surface side of said top wall portion.

6. The steering wheel according to claim 1, wherein said stationary contact is arranged at each of said base body portions, and said movable contact is arranged at each of said mounting portions.

7. The steering wheel comprising:
a steering wheel main body;
a horn-switching assembly; and
an air bag assembly;
wherein said steering wheel main body includes:
   a ring portion;
   a boss portion arranged at the center of said ring portion;
   a plurality of spoke portions for joining said boss portion and said ring portion;
   a core for joining said ring portion, said boss portion and said spoke portions;
wherein said air bag assembly is supported to said horn switch assembly and is arranged over the boss portion of said steering wheel main body and includes:
   an air bag formed into a bag shape and folded in an inflatable manner;
   an inflator for feeding said air bag with an inflating gas;
   a pad covering said folded air bag; and
   a bag holder for holding said air bag, said inflator and said pad;
wherein said horn switch assembly includes:
   a plurality of switch subassemblies having a stationary contact, a movable contact and a spring; and
   a support plate having a plurality of base body portions joining said each switch subassembly and a connecting portion connected to said steering wheel main body under said base body portion; and
   said spring is compressed by depressing said pad and said movable contact is contacted with said stationary contact;
wherein said bag holder includes:
   a lateral plate portion having a hole into which said inflator is inserted;
   an interconnecting plate portion extending upward from the edge of said lateral plate portion; and
   a plurality of mounting portions extending in the outer lateral direction from the upper end of said interconnecting plate portion and arranged over said each switch subassembly;
wherein said each switch subassembly is joined to said each base body portion of said support plate, and said each mounting portion of said bag holder in said air bag assembly assembled in advance is arranged over said each switch subassembly and thereby said air bag assembly is supported to said horn switch assembly; and
further, the connecting portion of said support plate is connected to said steering wheel main body and thereby said air bag assembly is arranged over the boss potion of said steering wheel main body.

\* \* \* \* \*